United States Patent
Min

(10) Patent No.: US 10,315,393 B2
(45) Date of Patent: Jun. 11, 2019

(54) AQUEOUS COMPOSITION FOR SURFACE COATING AND AUTOMOTIVE SHEET USING THE COMPOSITION

(71) Applicant: LG Hausys, Ltd., Seoul (KR)

(72) Inventor: Chul-Hee Min, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 68 days.

(21) Appl. No.: 15/520,469

(22) PCT Filed: Oct. 19, 2015

(86) PCT No.: PCT/KR2015/011043
§ 371 (c)(1),
(2) Date: Apr. 20, 2017

(87) PCT Pub. No.: WO2016/064152
PCT Pub. Date: Apr. 28, 2016

(65) Prior Publication Data
US 2017/0313037 A1     Nov. 2, 2017

(30) Foreign Application Priority Data
Oct. 20, 2014   (KR) .................. 10-2014-0141566

(51) Int. Cl.
*B32B 27/40*     (2006.01)
*B32B 27/08*     (2006.01)
(Continued)

(52) U.S. Cl.
CPC ............ *B32B 27/08* (2013.01); *B32B 5/245* (2013.01); *B32B 27/065* (2013.01); *B32B 27/40* (2013.01);
(Continued)

(58) Field of Classification Search
None
See application file for complete search history.

(56) References Cited

U.S. PATENT DOCUMENTS 4,248,930 A     2/1981  Haas et al.
6,387,997 B1 *  5/2002  Grolemund ........... C08F 283/12
                                                  524/457
(Continued)

FOREIGN PATENT DOCUMENTS

CN          1733851 A    2/2006
CN        101010397 A    8/2007
(Continued)

OTHER PUBLICATIONS

Extended European Search Report dated Aug. 28, 2017 from European Patent Office in connection with the counterpart European Patent Application No. 15852810.9 citing the above reference(s).
(Continued)

*Primary Examiner* — Robert S Loewe
(74) *Attorney, Agent, or Firm* — Hauptman Ham LLP

(57) ABSTRACT

Disclosed is an aqueous composition for surface coating, including: a main ingredient comprising a first compound having at least two functional groups selected from the group consisting of a carboxyl group, a hydroxyl group, an amino group and combinations thereof, per molecule; a curing agent comprising a second compound having at least two functional groups selected from the group consisting of an aziridine group, an isocyanate group, a carbodiimide group and combinations thereof, per molecule; and an aqueous solvent. Further, an automotive sheet using the aqueous composition for surface coating is disclosed.

16 Claims, 2 Drawing Sheets

(51) Int. Cl.
  *C09D 183/04* (2006.01)
  *C09D 201/02* (2006.01)
  *B32B 5/24* (2006.01)
  *B32B 27/06* (2006.01)
  *C08G 18/61* (2006.01)
  *C08G 18/63* (2006.01)
  *C08G 18/78* (2006.01)
  *C08G 18/79* (2006.01)
  *C08G 18/28* (2006.01)
  *C09D 175/04* (2006.01)
  *C09J 175/16* (2006.01)
  *C09D 201/08* (2006.01)
  *D06N 3/00* (2006.01)

(52) U.S. Cl.
  CPC ......... *C08G 18/2815* (2013.01); *C08G 18/61* (2013.01); *C08G 18/63* (2013.01); *C08G 18/7831* (2013.01); *C08G 18/792* (2013.01); *C08G 18/797* (2013.01); *C09D 175/04* (2013.01); *C09D 183/04* (2013.01); *C09D 201/02* (2013.01); *C09D 201/025* (2013.01); *C09D 201/08* (2013.01); *C09J 175/16* (2013.01); *D06N 3/0059* (2013.01); *C08G 2270/00* (2013.01); *D06N 2211/263* (2013.01)

(56) References Cited

U.S. PATENT DOCUMENTS

| | | | | |
|---|---|---|---|---|
| 6,395,820 B1* | 5/2002 | Lindenmuth | ........ | C09D 175/04 524/501 |
| 7,091,275 B1* | 8/2006 | Amick | ................. | C09D 133/02 524/502 |
| 2002/0160203 A1* | 10/2002 | Robertson | .......... | C08G 18/0823 428/423.1 |
| 2003/0105219 A1* | 6/2003 | Schutze | ............. | C08G 18/0823 524/589 |
| 2005/0027092 A1 | 2/2005 | Steidl et al. | | |
| 2005/0085616 A1* | 4/2005 | Licht | ........................ | C04B 24/28 528/61 |
| 2005/0249958 A1* | 11/2005 | Kania | .................. | C08G 18/283 428/423.1 |
| 2006/0030651 A1 | 2/2006 | Kubish et al. | | |
| 2006/0141236 A1 | 6/2006 | Nakamura et al. | | |
| 2007/0128351 A1* | 6/2007 | Nanna | .................... | C08G 18/10 427/180 |
| 2009/0087469 A1* | 4/2009 | Zhang | .................... | A61L 15/28 514/1.1 |
| 2009/0163648 A1 | 6/2009 | Muenzmay et al. | | |
| 2009/0264587 A1* | 10/2009 | Blum | .................. | C08G 18/0823 524/591 |
| 2010/0092783 A1* | 4/2010 | Takahara | ........... | C08G 18/0823 428/425.6 |
| 2011/0077349 A1* | 3/2011 | Hoshino | ............... | C08F 220/18 524/544 |
| 2011/0217471 A1* | 9/2011 | Schwendeman | ... | C08G 18/0866 427/385.5 |
| 2011/0244243 A1 | 10/2011 | Uemura et al. | | |
| 2012/0295106 A1 | 11/2012 | Cisowski et al. | | |
| 2013/0216837 A1* | 8/2013 | Iyer | ....................... | C08F 220/24 428/422 |
| 2013/0337160 A1* | 12/2013 | Holland | ............... | C09D 139/04 427/162 |
| 2015/0337096 A1* | 11/2015 | Olson | .................. | C08F 220/24 525/200 |
| 2016/0333155 A1* | 11/2016 | Bai | .................. | C08G 18/4018 |
| 2018/0305508 A1* | 10/2018 | Bai | .................... | C08G 18/4018 |

FOREIGN PATENT DOCUMENTS

| | | |
|---|---|---|
| CN | 101463173 A | 6/2009 |
| CN | 101792570 A | 8/2010 |
| CN | 102952492 A | 3/2013 |
| JP | 10-53709 A | 2/1998 |
| JP | 2006-77110 A | 3/2006 |
| KR | 1020080033556 A | 4/2008 |
| KR | 1020080077632 A | 8/2008 |
| WO | 2014/107878 A1 | 7/2014 |

OTHER PUBLICATIONS

International Search Report for PCT/KR2015/011043 dated Nov. 26, 2015, citing the above reference(s).
Chinese Office Action dated Nov. 8, 2018, in connection with the Chinese Patent Application No. 201580057109.1 citing the above reference(s).

* cited by examiner

Before crosslinking      After crosslinking

Before crosslinking      After crosslinking

Before crosslinking → After crosslinking

AQUEOUS COMPOSITION FOR SURFACE COATING AND AUTOMOTIVE SHEET USING THE COMPOSITION

CROSS REFERENCE TO RELATED APPLICATION

This present application is a national stage filing under 35 U.S.C § 371 of PCT application number PCT/KR2015/011043 filed on Oct. 19, 2015 which is based upon and claims the benefit of priority to Korean Patent Application No. 10-2014-0141566 filed on Oct. 20, 2014 in the Korean Intellectual Property Office. The disclosures of the above-listed applications are hereby incorporated by reference herein in their entirety.

TECHNICAL FIELD

The present disclosure relates to an aqueous composition for surface coating and an automotive sheet using the composition.

BACKGROUND ART

In general, polyvinyl chloride (PVC) resin is inexpensive and heat-resistant, and can take various forms in ductility and rigidity. Thus, it can be used as a raw material for flooring, medical equipment, wire insulator, interior sheet, signboard, or indoor/outdoor decorative sheet. For example, polyvinyl chloride resin can be used as a raw material for automotive sheet.

However, since an automotive has emerged as a second residential space, an automotive sheet occupies the largest portion in the vehicle. Therefore, consumers' interest in automotive sheets that can maintain a high level in the vehicle space is increasing. Further, in order to preserve clean environment in the vehicle, there is a growing need for studies on automotive sheets having high antifouling properties.

The Ministry of Land, Transport and Maritime Affairs has pronounced the "Standards for the Management of Indoor Air Quality in New Cars" as a result of steadily increasing interests in the indoor air quality of automotive. From new cars manufactured after Jul. 1, 2009, volatile organic compounds (VOCs) such as benzene, toluene, ethylbenzene and xylene, and formaldehydes are recommended to maintain at levels below the regulatory limits. Therefore, efforts should be made to improve the indoor air quality inside newly-manufactured automotive.

DISCLOSURE

Technical Problem

The present disclosure is intended to provide an aqueous composition for surface coating, including: a main ingredient comprising a first compound having at least two functional groups selected from the group consisting of a carboxyl group, a hydroxyl group, an amino group and combinations thereof, per molecule; a curing agent comprising a second compound having at least two functional groups selected from the group consisting of an aziridine group, an isocyanate group, a carhodiimide group and combinations thereof, per molecule; and an aqueous solvent.

However, the technical problem to be solved by the present disclosure is not limited to the above-mentioned problem, and other matters not mentioned can be clearly understood by those skilled in the art from the following description.

Technical Solution

The present disclosure provides an aqueous composition for surface coating, including: a main ingredient comprising a first compound having at least two functional groups selected from the group consisting of a carboxyl group, a hydroxyl group, an amino group and combinations thereof, per molecule; a curing agent comprising a second compound having at least two functional groups selected from the group consisting of an aziridine group, an isocyanate group, a carbodiimide group and combinations thereof, per molecule; and an aqueous solvent.

The main ingredient and the curing agent may form a polymer chain by a three-dimensional cross-linking reaction.

The polymer chain may have a crosslinking density of from 70% to 95%.

The polymer chain and a curing agent that does not participate in the three-dimensional crosslinking reaction may form an interpenetrating polymer network.

The main ingredient may be a prepolymer containing a urethane group in a backbone of the first compound.

The second compound may be mixed in an amount of 1 to 10 equivalents based on 100 equivalents of the prepolymer.

The prepolymer may have a weight average molecular weight ranging from 100 to 300,000.

The main ingredient may be a silicon-containing prepolymer comprising a siloxane group in a backbone of the first compound.

The second compound may be mixed in an amount of 1 to 10 equivalents based on 100 equivalents of the silicon-containing prepolymer.

The silicon-containing prepolymer may have a weight average molecular weight ranging from 100 to 300,000.

The aqueous solvent may be water or an alcohol.

The aqueous composition for surface coating comprises 20 to 60% by weight of the main ingredient, 10 to 50% by weight of the curing agent, and 10 to 30% by weight of the aqueous solvent, based on the total weight of the aqueous composition for surface coating.

In addition to the main ingredient and the curing agent, the composition may include at least one selected from the group consisting of silicone beads, urethane beads, acrylic beads, fluorine-containing waxes, and combinations thereof.

In addition to the main ingredient and the curing agent, the composition may further include at least one selected from surfactants, co-solvents, modifiers, leveling agents, thickeners, and combinations thereof.

In one embodiment of the present disclosure, there is provided an automotive sheet, comprising: a surface coating layer formed from the aqueous composition for surface coating; a cover layer formed under the surface coating layer; a foaming layer formed under the cover layer; and a backing layer formed under the foaming layer.

The surface coating layer may be formed by applying the aqueous composition for surface coating with a thickness of 1 μm to 20 μm, followed by drying and aging. The aging may be carried out by a primary aging at a temperature of equal to or higher than a minimum film forming temperature (MITT), and then a secondary aging at a temperature of equal to or higher than a glass transition temperature (Tg).

A primer layer may be further formed between the surface coating layer and the cover layer.

Advantageous Effects

The aqueous composition for surface coating according to the present disclosure employs an aqueous solvent, whereby an interpenetrating polymer network can be formed, and the generation of odorous substances from volatile organic compounds (VOCs) caused by the use of an organic solvent can be reduced.

In addition, the aqueous composition for surface coating according to the present disclosure can improve antifouling property with excellent stain resistance, and can improve the slip performance, thereby minimizing the problem caused by friction noise.

The automotive sheet according to the present disclosure can be used to improve the indoor air quality in an automotive and to be applied excellently to the base layer with a bright color due to the improved antifouling property.

BEST MODE

Figure 1:
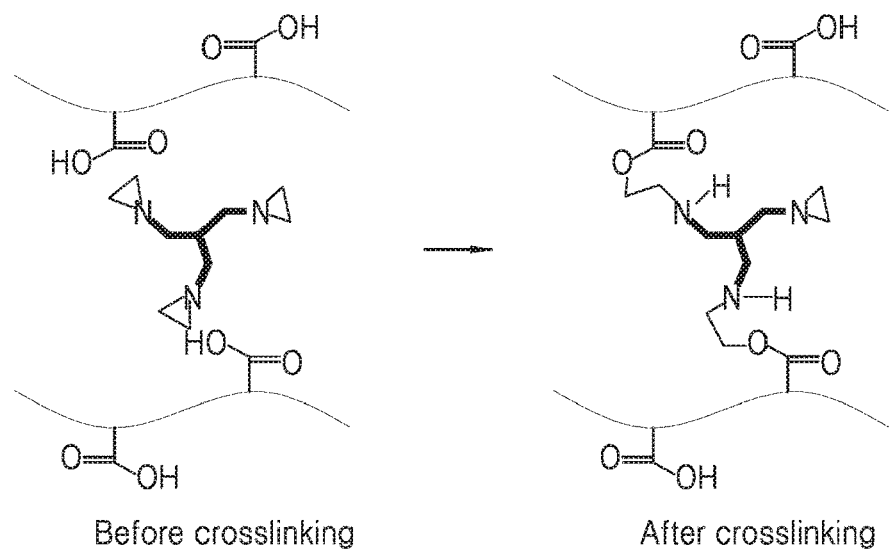
FIG. 1a to 1c schematically illustrate formulae before and after cross-linking of a main ingredient and a curing agent according to various embodiments of the present disclosure.
Figure 1:
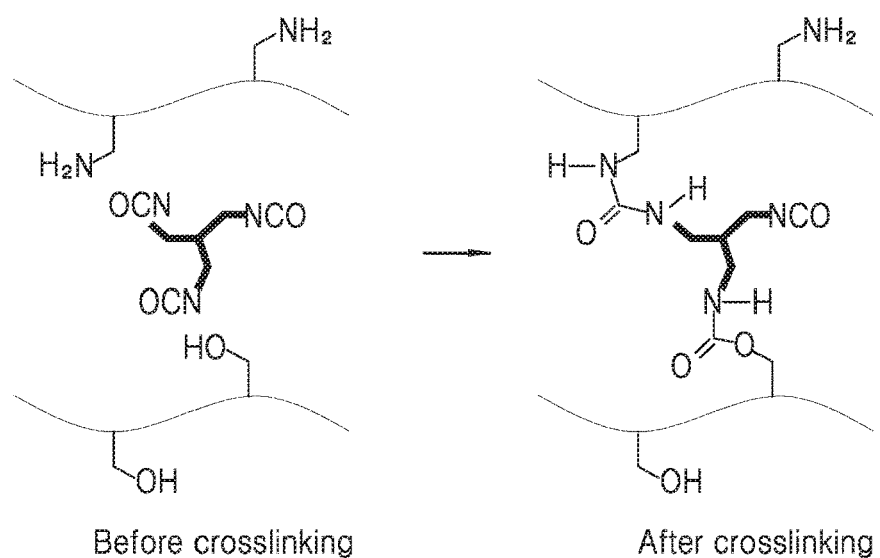
Figure 1:
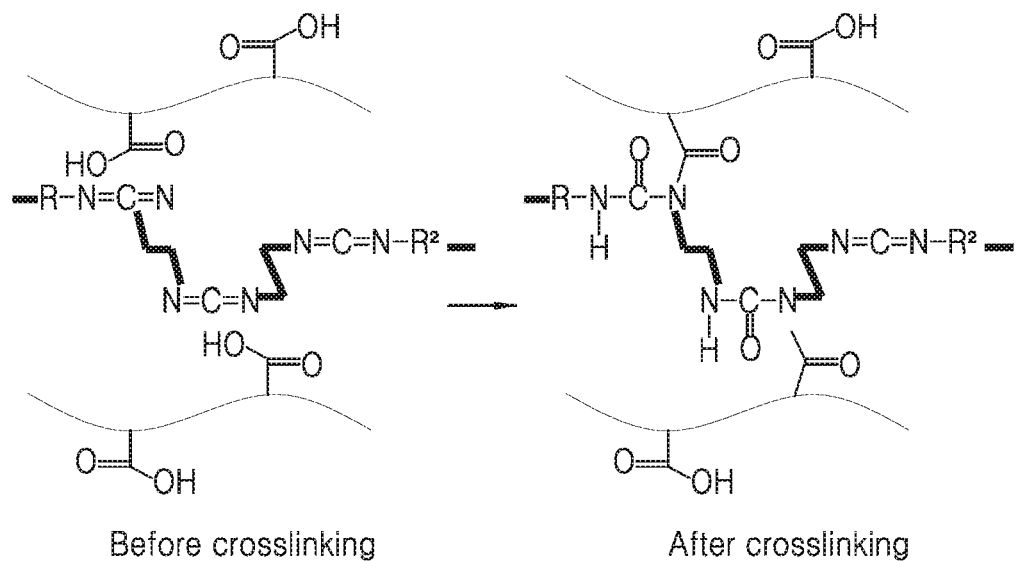

Hereinafter, exemplary embodiments of the present disclosure will be described in detail with reference to the accompanying drawings, which will be readily practiced to those skilled in the art. The present disclosure may be embodied in many different forms and is not limited to the embodiments described herein.

In order to clearly illustrate the present disclosure, parts that are not related to the description are omitted, and the same or similar components are denoted by the same reference numerals throughout the specification.

In the drawings, the thickness is enlarged to clearly indicate layers and regions. In the drawings, for the convenience of explanation, the thicknesses of some layers and regions are exaggerated.

As used herein, the formation of any structure in an "upper (or lower)" of a substrate means not only that any structure is formed in contact with an upper surface (or lower surface) of the substrate, but also that other configurations between the substrate and any structure formed on (or under) the substrate are possible.

Aqueous Composition for Surface Coating

One embodiment of the present disclosure provides an aqueous composition for surface coating, including: a main ingredient comprising a first compound having at least two functional groups selected from the group consisting of a carboxyl group, a hydroxyl group, an amino group and combinations thereof, per molecule; a curing agent comprising a second compound having at least two functional groups selected from the group consisting of an aziridine group, an isocyanate group, a carhodiimide group and combinations thereof, per molecule; and an aqueous solvent.

The aqueous composition for surface coating may form a polymer chain by a three-dimensional crosslinking reaction of the main ingredient and the curing agent.

Particularly, the three-dimensional crosslinking reaction may be carried out at room temperature or at a temperature of from about 40° C. to about 1,400° C.

The polymer chain may have a crosslinking density ranging from 70% to 95%. As used herein, the crosslinking density of the polymer chain refers to a ratio of the number of crosslinking points to the total number of constituent units of the polymer chain. The crosslinking density can be determined by the following crosslinking degree measurement method (KS M 3357). The crosslinking density is maintained within the above range such that contaminants such as jeans dyes are prevented from penetrating the aqueous composition for surface coating so that the effect of stain resistance can easily be realized.

The polymer chain and a curing agent that does not participate in the three-dimensional crosslinking reaction may form an interpenetrating polymer network.

The interpenetrating polymer network is a multicomponent polymer in which heterogeneous polymer chains are entangled without covalent bonding. Therefore, the polymer chain formed by the three-dimensional crosslinking reaction may be intertwined with a residual curing agent that does not participate in the three-dimensional crosslinking reaction due to the aqueous solvent.

A conventional one-component type surface coating composition for coating the surface of an automotive sheet shows jeans staining less than grade 4. However, the present aqueous composition for surface coating is a two-component type of aqueous composition for surface coating, wherein the automotive sheet can be applied to a regular thickness as a base layer, allowing excellent stain resistance and slip property. In this embodiment, the jeans-staining shows a grade 4 or higher.

In addition to the jeans staining, as the activity in a vehicle becomes more active, there may be general contaminations due to food, external dust, and various other types of causes. Such stain property as a measure of a general contamination can be determined by attaching an automotive sheet to a Universal Wear Tester. The resultant values can be expressed as a percentage. In this case, when the resultant value is 17% or less, it is said that the contamination is generally low.

Specifically, the automotive sheet using an one-component type surface coating composition for coating the surface of the automotive sheet showed a high contamination level of about 30% or more, while the automotive sheet using a two-component type surface coating composition showed a contamination level of about 10% or less.

Thus, the aqueous composition for surface coating according to the present disclosure improves the conventional one-component type surface coating composition. The composition may be coated on the surface of an automotive sheet by a gravure coating method. The two-component type aqueous composition for surface coating can improve the stain resistance in the automotive sheet, so that a bright colored automotive sheet with excellent antifouling properties can be used.

The two-component type aqueous composition for surface coating can improve the stain resistance in the automotive sheet, so that it is possible to use a bright colored automotive sheet with excellent antifouling properties.

In addition, the composition improves slip performance along with the stain resistance. Accordingly the composition can minimize a noise in automotive due to the automotive sheet, and can minimize the problems caused by friction noise from a friction between the automotive sheet and the passenger.

Further, the aqueous composition for surface coating according to the present disclosure can form an interpenetrating polymer network by using an aqueous solvent, and can reduce the generation of odorous substances from volatile organic compounds (VOCs) due to the use of organic solvents such as methyl isobutyl ketone (MIBK), methyl ethyl ketone (MEK), acetone, butyl acetate (BA), methyl acetate M, dimethyl formamide (DMF), cyclohexane, etc.

First, the aqueous composition for surface coating may include a main ingredient comprising a first compound.

The first compound may have at least two functional groups selected from the group consisting of a carboxyl group, a hydroxyl group, an amino group, and combinations thereof, per molecule. Specifically, the first compound may be at least one compound selected from the group consisting of a polyester-based compound, a lactone-based compound, a polycarbonate-based compound, a polyether-based compound, and combinations thereof, and the first compound may have at least two functional groups selected from the group consisting of a carboxyl group, a hydroxyl group, an amino group, and combinations thereof, at a molecular terminal thereof.

For example, the main ingredient may be a prepolymer containing a urethane group in a backbone of the first compound.

The prepolymer indicates a polymer having a relatively low degree of polymerization in which the polymerization reaction is stopped in the mid-stage to facilitate molding. The prepolymer contains a urethane group in a backbone of the first compound having at least two functional groups selected from the group consisting of a carboxyl group, a hydroxyl group, an amino group, and combinations thereof, per molecule. The prepolymer has an isocyanate reactive group at a terminal of the resin. For example, the prepolymer may include the following formula (1):

Meanwhile, when the prepolymer and the second compound react with each other out of the mixing ratio of the above range, the functional groups of the prepolymer or the functional groups of the second compound remain as a residue to form a weak point at which the bonding is weak in the composition bound after the reaction, whereby the composition formed by the reaction can easily be decomposed. Also, the initial reaction may occur excessively and accordingly premature curing may occur.

The prepolymer may have a weight average molecular weight ranging from about 100 to about 300,000. The weight average molecular weight of the prepolymer is maintained within the above range such that the stain resistance can easily be realized.

In particular, when the prepolymer is a polyol compound containing a hydroxy group, the hydroxyl value (OH Value) of the prepolymer may be about 2 to about 1,000. Specifically, as used herein, the hydroxyl value refers to a milligram of potassium hydroxide required to neutralize an acetic acid produced by acetylating 1 g of the prepolymer and then hydrolyzing the acetylated prepolymer.

Polyol compounds with a low hydroxyl value are typically used in the preparation of soft polyurethanes, while polyol compounds with a high hydroxyl value are used in the preparation of hard polyurethanes. That is, the higher hydroxyl value means that the molecular weight of the polyol compound is lowered, and the composition ratio of the second compound constituting the hard segment of the polyurethane increases, resulting in a hard physical property.

Therefore, when the hydroxyl value of the prepolymer is out of the above range, the aqueous composition for surface coating is hardened to cause cracking, and the density of the prepolymer is lowered so that the aqueous composition for surface coating cannot secure a stain resistance. Therefore, the hydroxyl value should be maintained in the above range, such that lip excellent stain resistance can be secured, and the hardening of the aqueous composition for surface coating can be prevented.

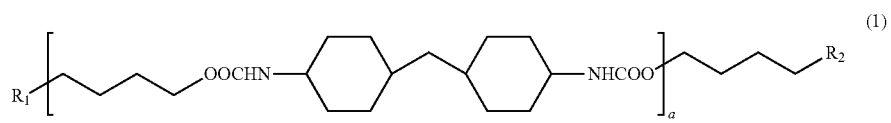

wherein $R_1$ and $R_2$ are independently of each other identical or different, and are a carboxyl group, a hydroxyl group or an amino group, and n is an integer of 100 to 200.

Further, the second compound may be mixed in an amount of about 1 to about 10 equivalents based on 100 equivalents of the prepolymer. As used herein, the term "equivalent weight" indicates the amount of another substance that optionally reacts precisely with a fixed amount of a substance or binds to the substance in a reaction. The aqueous composition for surface coating formed by mixing about 1 to about 10 equivalents of the second compound relative to 100 equivalents of the prepolymer may reduce cracking and easily increase stain resistance.

As another example, the main ingredient may be a silicon-containing prepolymer comprising a siloxane group in a backbone of the first compound.

The main ingredient may include a silicon-containing prepolymer comprising a siloxane group in a backbone of the first compound having at least two functional groups selected from the group consisting of a carboxyl group, a hydroxyl group, an amino group and combinations thereof, per molecule, wherein the silicon-containing prepolymer may have an isocyanate reactive group at a terminal of the resin. For example, the prepolymer may include the following formula (2):

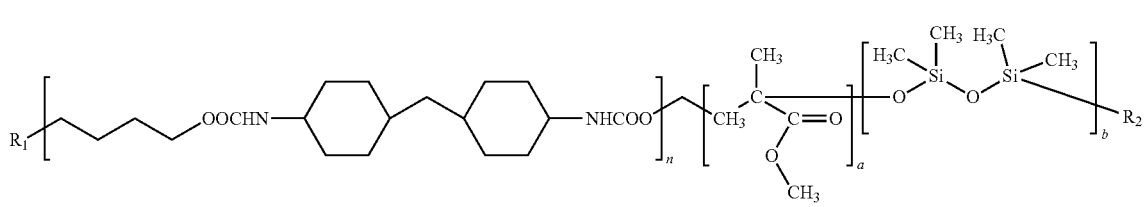

(2)

wherein $R_1$ and $R_2$ are independently of each other identical or different, and are a carboxyl group, a hydroxyl group or an amino group, and n, a and b are each an integer of 100 to 200.

The silicon-containing prepolymer may have antifouling property (resistance to contamination) by containing at least one methyl group in —Si— as in the above formula (2), and the silicon-containing prepolymer may maintain excellent compatibility with polyurethane-based compounds by containing an acrylate. Further, the silicon-containing prepolymer can be introduced into the first compound to react with an organic alkoxysilane compound to increase a crosslinking density, and improve the physical and chemical properties such as hardness, anti-fingerprint, chemical resistance, water resistance, and adhesion.

Specifically, the isocyanate compound may be mixed in an amount of about 1 equivalent to about 10 equivalents based on 100 equivalents of the silicon-containing lip prepolymer. The isocyanate compound may be mixed in an amount of about 1 equivalent to about 10 equivalents based on 100 equivalents of the silicon-containing prepolymer, such that the penetration of external contaminants or adhesion of external contaminants can be minimized, thereby facilitating the antifouling effect.

The silicon-containing prepolymer may have a molecular weight ranging from about 100 to about 100,000. The molecular weight of the silicon-containing prepolymer should be maintained within the above range so that the stain resistance effect can easily be realized.

In particular, when the silicon-containing prepolymer is a silicon-containing polyol compound containing a hydroxy group, the hydroxyl value (OH Value) of the silicon-containing prepolymer may be about 2 to about 1,000. Since the silicon-containing prepolymer contains a hydroxyl group, the hydroxyl value can be calculated, and it is advantageous to maintain high antifouling property by keeping the hydroxyl value within the above range.

Next, the aqueous composition for surface coating may include a curing agent comprising a second compound.

The second compound may have at least two functional groups selected from the group consisting of an aziridine group, an isocyanate group, a carbodiimide group, and combinations thereof, per molecule.

Specifically, the compound having two or more aziridine groups refers to a compound comprising a complex ternary ring composed of two carbon atoms and one nitrogen atom, and particularly, may be at least one compounds selected from the group consisting of 3-(3-methoxyphenyl)-3-trifluoromethyl)-diazitidine; 3-(trifluoromethyl)-3-phenyldiaziridine; propane-2,2-diyldibenzene-4,1-diyl diaziridine-1-carboxylate; 1,1'-(butylphosphoryl)diaziridine; oxydiethane-2,1-diyl diaziridine-1-carboxylate; 3,3-bis(1,1-difluorohexyl)-[1,2]diaziridine; 1-Aziridinepropanoicacid; 2-methyl-2-[[3-(2-methyl-1-aziridinyl)-1-oxopropoxy]methyl]-1,3-propanediylester; 2-ethyl-2-[[3-(2-methyl-1-aziridinyl)-1-oxopropoxy]methyl]-1,3-propanediylester; 2-ethyl-2-[[3-(2-methyl-1-aziridinyl)-1-oxopropoxy]methyl]-1,3-propanediylbis(2-methyl-1-aziridinepropanoate); pentaerythritol tris[3-(1-aziridinyppropionate]); pentaerythritol tris(3-aziridinopropionate), and combinations thereof.

The compound having two or more isocyanate groups may be at least one compound selected from the group consisting of toluene diisocyanate, diphenylmethane diisocyanate, modified diphenyitnethane diisocyanate, naphthalene diisocyanate, phenylene diisocyanate, hexamethylene diisocyanate, lysine isocyanate, cyclohexane diisocyanate, isophorone diisocyanate, methylenediphenyl isocyanate, xylene diisocyanate, tetramethylxylene diisocyanate, norbornene diisocyanate, triphenylmethane triisocyanate, polyphenyl polymethylene polyisocyanate, polyisocyanates containing a carbodiimide group, polyisocyanate containing an allophanate group, polyisocyanates containing a isocyanurate group, and combinations thereof.

Specifically, the compound having two or more isocyanate groups may include those of a biuret, a trimeric, and an adduct type. For example, the biuret type isocyanate compound may include the following formula (3), the trimeric isocyanate compound may include the following formula (4), and the adduct type isocyanate compound may include the following formula (5):

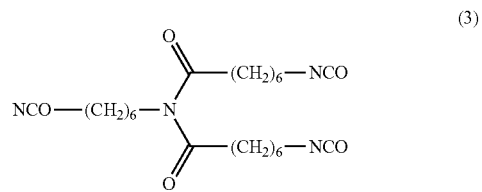

(3)

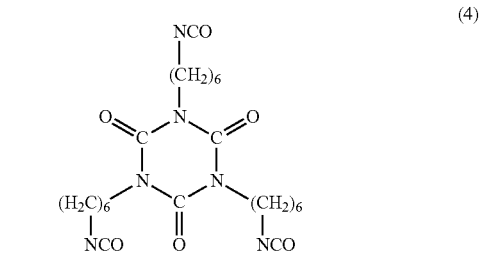

(4)

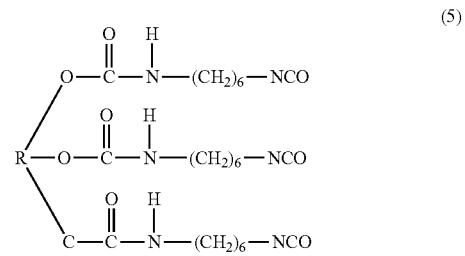

(5)

The compound having two or more carbodiimide groups may be 1-ethyl-3-(3-dimethylamino)propyl)carbodiimide compound, and particularly CARBODILITE™ or BAYDERM™ can be used.

Recently, consumers' interest in antifouling automotive sheets has been increasing in order to preserve the clean environment in a car. Especially, the problem of Blue Jean Dye Soil is emerging to meet the needs of consumers. Therefore, the jeans staining indicates problems that the stains are dyed on the surface thin film treated with a conventional automotive sheet or a urethane of automotive sheet, and are not removed even after the cleaning of the sheet. At this time, the jeans' stain resistance against the jeans staining can be measured at a rate of the extent lip to which blue dye is transferred after an automotive sheet is worn under a constant load using a Martindale Abrasion Tester. The staining can be represented by a gray scale grade, and the gray scale grade is divided into total five grades, and the higher the grade, the better the stain resistance.

Finally, the aqueous composition for surface coating comprises an aqueous solvent. Specifically, the aqueous solvent may be water or an alcohol such as methanol, ethanol, propanol, and butanol. Due to the aqueous solvent, the polymer chain and a curing agent that does not participate in the three-dimensional crosslinking reaction may be intertwined to form an interpenetrating polymer network. Thus, the generation of odorous substances due to volatile organic compounds (VOCs) by the use of an organic solvent can be reduced.

In one embodiment of the present disclosure, 70 to 80% by weight of the main ingredient, 10 to 20% by weight of the curing agent, and 10 to 20% by weight of the aqueous solvent may be included, based on the total weight of the aqueous composition for surface coating.

Specifically, the main ingredient, the curing agent and the aqueous solvent are contained within the above-mentioned content range in the aqueous composition for surface coating, such that excellent stain resistance can easily be achieved.

In addition to the above-mentioned main ingredient and the curing agent, the composition may further include at least one selected from silicon beads, urethane beads, acrylic beads, fluorine-containing waxes, and combinations thereof. The at least one selected from the group consisting of silicon beads, urethane beads, acrylic beads, fluorine-containing waxes, and combinations thereof is contained in the aqueous coating composition for surface coating, such that slip property of the composition can be improved.

The resistance to contaminants can be increased by the at least one hydrophobicity selected from the silicon beads, urethane beads, acrylic beads, fluorine-containing waxes, and combinations thereof. Further, it is possible to impart slip property to the aqueous composition for surface coating by reducing the surface tension of the aqueous composition for surface coating.

The at least one selected from the group consisting of silicon beads, urethane beads, acrylic beads, fluorine-containing waxes and combinations thereof may be contained about 1% by weight to about 10% by weight, based on the total weight of the aqueous composition for surface coating. The presence of the at least one selected from the group consisting of silicone beads, urethane beads, acrylic beads, fluorine-containing waxes and combinations thereof within the above range can reduce the occurrence of the dye-adhesion of other substances to the aqueous composition for surface coating, and can easily reduce its surface energy.

In addition to the at least one selected from the group consisting of the silicone beads, the urethane beads, the acrylic beads, the fluorine-containing wax, and combinations thereof, the aqueous composition for surface coating may further include a surfactant, a co-solvent, a modifier, a levelling agent, a thickening agent, and combinations thereof, depending on the role of the composition.

FIG. 1a to 1c schematically illustrate formulae before and after cross-linking of a main ingredient and a curing agent according to various embodiments of the present disclosure.

Referring to FIG. 1a, the first compound having a carboxyl group and the second compound having an aziridine group are shown before and after cross-linking. The aziridine group of the second compound imparts an active site capable of binding to the carboxyl group of the first compound. Therefore, the crosslinking density can be controlled depending on the number of the respective functional groups and the like.

Referring to FIG. 1b, the first compound having an amino group and the second compound having an isocyanate group are shown before and after cross-linking. The isocyanate group of the second compound imparts an active site capable of binding to the amino group of the first compound. Therefore, the crosslinking density can be controlled depending on the number of the respective functional groups and the like.

Referring to FIG. 1c, the first compound having a carboxyl group and the second compound having a carbodiimide group are shown before and after cross-linking. The carbodiimide group of the second compound imparts an active site capable of binding to the carboxyl group of the first compound. Therefore, the crosslinking density can be controlled depending on the number of the respective functional groups and the like.

Automotive Sheet

A further embodiment of the present disclosure provides an automotive sheet, comprising: a surface coating layer formed from the aqueous composition for surface coating; a cover layer formed under the surface coating layer; a foaming layer formed under the cover layer; and a backing layer formed under the foaming layer.

Figure 2:
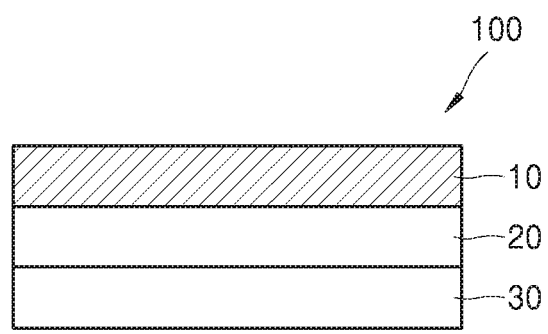
FIG. 2 is a schematic view of an automotive sheet according to an embodiment of the present disclosure.

FIG. 2 is a schematic view of an automotive sheet according to an embodiment of the present disclosure. Referring to FIG. 2, the automotive sheet 100 is formed including a surface coating layer 10, a cover layer 20, a foaming layer 30, and a backing layer 40.

The surface coating layer 10 is formed from the aqueous composition for surface coating comprising a main ingredient comprising a first compound having at least two functional groups selected from the group consisting of a carboxyl group, a hydroxyl group, an amino group and combinations thereof, per molecule; a curing agent comprising a second compound lip having at least two functional groups selected from the group consisting of an aziridine group, an isocyanate group, a carbodiimide group and combinations thereof, per molecule; and an aqueous solvent. Thus, the surface coating layer 10 can improve the antifouling property due to excellent stain resistance of the aqueous composition for surface coating, and can minimize a friction noise due to the improved slip performance.

The specific aqueous composition for surface coating is as described above.

The surface coating layer 10 may be formed by applying the aqueous composition for surface coating with a thickness of about 4 μm to about 20 μm, followed by drying and aging.

Specifically, the aqueous composition for surface coating may be applied to the upper surface of the cove layer to form the surface coating layer having a thickness of about 4 µm to about 20 µm. The thickness of the surface coating layer should be maintained within the above range, such that the stain resistance can be secured while simultaneously maintaining the flexibility of the surface of the automotive sheet. Thereafter, the applied aqueous composition for surface coating is dried to evaporate the aqueous solvent, and the dried aqueous composition for surface coating can be aged to finally form the surface coating layer.

In this embodiment, the aging may be carried out by a primary aging at a temperature of equal to or higher than a minimum film forming temperature (MFFT), and then a secondary aging at a temperature of equal to or higher than a glass transition temperature (Tg). A polyhedric structure may be formed through the primary aging and then a homogeneous structure may be formed through the secondary aging.

The cover layer 20 is a layer formed under the surface coating layer 10, and particularly may include at least one compound selected from the group consisting of polyvinyl chloride (PVC), polyvinyl chloride copolymer, polyurethane (PU), polyurethane copolymer, polypropylene oxide (PPO), polypropylene oxide copolymer, polyethylene oxide (PEO), polyethylene oxide copolymer, polyether urethane, cellulose acetate, cellulose acetate butyrate, cellulose acetate propionate, polymethyl methacrylate (PMMA), polymethyl acrylate (PMA), polyacrylic copolymer, polyvinyl acetate (PVAc), polyvinyl acetate copolymer, polyvinyl alcohol (PVA), polyperfuryl alcohol (PHA), polystyrene (PS), polystyrene copolymer, polycarbonate (PC), polycaprolactone (PCL), polyvinylpyrrolidone (PVP), polyvinylidene fluoride (PVdF), polyvinylidene fluoride copolymer, polyamide, and combinations thereof. At least one compound selected from the group consisting of PVC, PVC-ABS, PU, PPO, and combinations thereof is more preferred, but not limited thereto.

The foaming layer 30 is formed below the cover layer 20 to absorb shock. Particularly, at least one compound selected from the group consisting of polyvinyl chloride (PVC), polyvinyl chloride copolymer, polyurethane (PU), polyurethane copolymer, polypropylene oxide (PPO), polypropylene oxide copolymer, polyethylene oxide (PEO), polyethylene oxide copolymer, polyether urethane, cellulose acetate, cellulose acetate butyrate, cellulose acetate propionate, polymethyl methacrylate (PMMA), polymethyl acrylate (PMA), polyacrylic copolymer, polyvinyl acetate (PVAc), polyvinyl acetate copolymer, polyvinyl alcohol (PVA), polyperfuryl alcohol (PPFA), polystyrene (PS), polystyrene copolymer, polycarbonate (PC), polycaprolactone (PCL), polyvinylpyrrolidone (PVP), polyvinylidene fluoride (PVdF), polyvinylidene fluoride copolymer, polyimide, and combinations thereof may be foamed by a blowing agent. More preferably, at least one compound selected from the group consisting of PVC, PVC-ABS, PU, PPO, and combinations thereof may be foamed by a blowing agent, but not limited thereto.

The backing layer 40 may be a textile comprising a woven or non-woven fabric.

Further, a primer layer (not shown) may be additionally formed between the surface coating layer 10 and the cover layer 20. In this embodiment, the primer layer may include a urethane-based adhesive resin or an acrylic adhesive resin containing a urethane acrylate compound.

The urethane-based adhesive resin includes a urethane acrylate compound. The urethane acrylate compound would be similar in properties to the aqueous composition for surface coating forming the surface coating layer. Therefore, the urethane acrylate compound is excellent in adhesion to the surface coating layer, so that the adhesion between the substrate layer and the surface coating layer can be stabilized. For example, the urethane-based adhesive resin may include a urethane acrylate compound like a two-component type aqueous composition for surface coating as in the surface coating layer. Therefore, the urethane-based adhesive resin can further secure the stain resistance by using a two-component type urethane acrylate compound not only in the surface coating layer but also in the primer layer, and a bright colored base layer can be used due to excellent antifouling property.

Hereinafter, preferred examples of the present disclosure will be described in order to facilitate understanding of the present disclosure. However, the following examples are provided only for the purpose of easier understanding of the present disclosure, and the present disclosure is not limited by the following examples.

EXAMPLES

Example 1

An aqueous composition for surface coating was prepared by mixing 40 parts by weight of a first compound of the formula (1) (n=100, $R_1$ and $R_2$, are carboxyl groups), 30 parts by weight of a second compound of the formula (3), 20 parts by weight of water, 5 parts by weight of silicone beads, and 5 parts by weight of fluorine-containing wax, and heating the mixture at a temperature of 100° C. for 2 minutes to form an interpenetrating polymer network structure.

A urethane-based adhesive resin containing a urethane acrylate compound was applied over an artificial leather to form a primer layer, and the aqueous composition for surface coating was applied over the primer layer to a thickness of 5 µm. Then, water was evaporated by drying at a temperature of 140° C., a primary aging was performed at a temperature of 80° C., and a secondary aging was performed at a temperature of 50° C. to form a surface coating layer, thereby preparing an automotive sheet.

Example 2

An automotive sheet was prepared in the same manner as in Example 1, except that 40 parts by weight of the first compound of Formula (2) (n=100, $R_1$ and $R_2$ are carboxyl groups), 30 parts by weight of the second compound of Formula (3), 20 parts by weight of water, 5 parts by weight of silicone beads, and 5 parts by weight of fluorine-containing wax were mixed, and the mixture was heated at a temperature of 100° C. for 2 minutes to form an interpenetrating polymer network structure, thereby preparing an aqueous composition for surface coating.

Comparative Example 1

An automotive sheet was prepared in the same manner as in Example 1, except that 40 parts by weight of the first compound of the formula (1) (n=100, $R_1$ and $R_2$ are carboxyl groups), 30 parts by weight of the second compound of the formula (3), 20 parts by weight of methyl isobutyl ketone (MIBK), and 5 parts by weight of silicone beads were mixed, and the mixture was heated at a temperature of 100° C. for 2 minutes to form a polymer network structure, thereby preparing a composition for surface coating.

Comparative Example 2

An automotive sheet was prepared in the same manner as in Example 1, except that (PTMG (poly(tetramethyl ether)

glycol) was used instead of the first compound of the formula (1) (n=100, $R_1$ and $R_2$ are carboxyl groups) and IPDI (Isoporon Diisocyanate) was used instead of the second compound of the formula (2).

Experimental Example: Evaluation of Physical Properties (1) Measurement of Crosslinking Density The crosslinking densities (%) of the compositions according to Examples 1 and 2 and Comparative Examples 1 and 2 were measured using the Method of Measuring the Degree of Crosslinking (KS M 3357).

(2) Measurement of Jeans Staining

Test specimens of automotive sheet according to Examples 1 and 2 and Comparative Examples 1 and 2 were subjected to 12 kPa using a Martindale Abrasion Tester and worn for 1,000 cycles. Then, the degree of staining was graded in a grey scale, the stained area was washed with 0.5% solution of soapy water, and the degree of jeans staining in the washed area was measured.

(3) Measurement of Staining

Test specimens of automotive sheet according to Examples 1 and 2 and Comparative Examples 1 and 2 were mounted on a Universal Wear Tester, a piece of Cotton Soil Test Cloth was placed on an upper portion of the automotive sheet, and 0.9 kg of a constant load was applied. At this time, 0.14 kgf/cm² of pressure was applied to a Rubber Diaphragm to stain the automotive sheet for 500 cycles, and the automotive sheet was stained again for 500 cycles after the stained cloth was replaced. The stained automotive sheet was placed on an opening of the colorimeter, and a green filter was mounted to measure a reflection value for the automotive sheet at an area that was not stained. The reflection values (%) at the mid-polished portions between the center and the periphery of the stained portion were measured, and the average value (%) of staining was calculated.

(3) Measurement of Squeak Index

Using a universal testing machine, each of the automotive sheet test specimens according to Examples 1 and 2 and Comparative Examples 1 and 2 was superimposed on top of each other and pressed with a force of 4.5 Kg, and the deviation (ΔF) and the mean force (Fa) of a force required to pull at a speed of 100 mm/melee were measured, and the Squeak index was calculated by ΔF/Fa.

(4) Measurement of the Degree of Generation of Odorous Substances

The automotive sheet test specimens according to Examples 1 and 2 and Comparative Examples 1 and 2 were placed in a 4-L desiccator, sealed, and heated in an oven for 2 hours. Then, after being allowed to stand for 1 hour in a laboratory at 25° C., the lid of the desiccator was opened about 3 to 4 cm, and the intensity of the smell emitted was measured under dry conditions. Distilled water was uniformly applied to test specimens of the automotive sheet according to Examples 1 and 2 and Comparative Examples 1 and 2, put in a 4 L test container, and allowed to stand in a laboratory at 25° C. for 1 hour. The lid was opened about 3 to 4 cm and the intensity of the smell emitted was measured under wet conditions. The intensity of the smell under the measured dry conditions and the intensity of the smell under the measured wet conditions were averaged to determine the degree of generation of odorous substances by volatile organic compounds (VOCs) (Grade 1: No smell, Grade 2: Nearly undetectable odor, Grade 3: Smell is weakly detected and not disgusting, Grade 4: Smell is easily detected and somewhat disgusting, Grade 5: Strong smell and disgusting, Grade 6: Irritating and intense smell).

TABLE 1

| | Ex. 1 | Ex. 2 | C. Ex. 1 | C. Ex. 2 |
|---|---|---|---|---|
| Solvent | aqueous | aqueous | oily | aqueous |
| Type | 2-component | 2-component | 2-component | 1-component |
| Crosslinking density (%) | 90 | 85 | 80 | 30 |
| Jeans staining grey scale | Grade 4.7 | Grade 4.3 | Grade 4 | Grade 3 |
| Staining (%) Before/after illumination | 7/8 | 10/11 | 14/15 | 14/15 |
| Squeak index | 0.09 | 0.1 | 0.14 | 0.1 |
| Degree of generation of odorous substance | Grade 3 | Grade 3 | Grade 4 | Grade 3 |

As shown in Table 1, we confirmed that the automotive sheet comprising the surface coating layer formed of the two-component type aqueous composition for surface coating comprising a main ingredient, a curing agent and an aqueous solvent according to Examples 1 and 2 has high crosslinking density, can improve the antifouling property with an excellent stain resistance, and further provide improved slip performance with a low Squeak index.

In addition, the automotive sheet comprising a surface coating layer formed of a two-component type aqueous composition for surface coating comprising a main ingredient, a curing agent and an aqueous solvent according to Examples 1 and 2 can reduce the generation of odorous substances from volatile organic compounds (VOCs) due to the use of an organic solvent.

It will be understood by those skilled in the art that the foregoing description of the present disclosure is presented for illustrative purposes and that various other changes in forms and details may be made therein without departing from the spirit and scope of the present disclosure. It is therefore to be understood that the embodiments described above are illustrative in ail aspects and not restrictive.

The invention claimed is:

1. An aqueous composition for surface coating, comprising:
a main ingredient comprising a first compound having at least two functional groups selected from the group consisting of a carboxyl group, a hydroxyl group, an amino group and combinations thereof, per molecule, wherein the main ingredient is a silicon-containing prepolymer comprising a siloxane group in a backbone of the first compound, and the prepolymer comprises a molecule represented by formula (2):

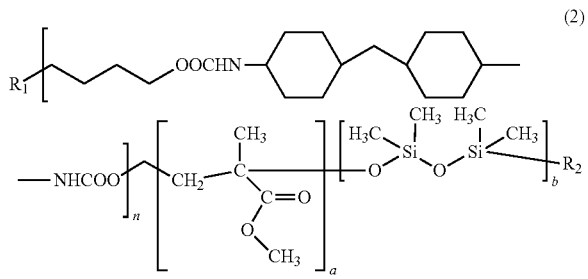

wherein, in formula (2), $R_1$ and $R_2$ are independently selected from the group consisting of a carboxyl group, a hydroxyl group and an amino group, and n, a and b are each independently selected from an integer ranging from 100 to 200;

a curing agent comprising a second compound having at least two functional groups selected from the group consisting of an aziridine group, an isocyanate group, a carbodiimide group and combinations thereof, per molecule; and an aqueous solvent.

2. The aqueous composition for surface coating of claim 1, wherein the main ingredient and the curing agent form a polymer chain by a three-dimensional cross-linking reaction.

3. The aqueous composition for surface coating of claim 2, wherein the polymer chain has a crosslinking density of from 70% to 95%.

4. The aqueous composition for surface coating of claim 2, wherein the polymer chain and a curing agent that does not participate in the three-dimensional crosslinking reaction form an interpenetrating polymer network.

5. The aqueous composition for surface coating of claim 1, wherein the second compound is mixed in an amount of 1 to 10 equivalents based on 100 equivalents of the prepolymer.

6. The aqueous composition for surface coating of claim 5, wherein the prepolymer has a weight average molecular weight ranging from 100 to 300,000.

7. The aqueous composition for surface coating of claim 1, wherein the second compound is mixed in an amount of 1 to 10 equivalents based on 100 equivalents of the silicon-containing prepolymer.

8. The aqueous composition for surface coating of claim 1, wherein the silicon-containing prepolymer has a weight average molecular weight ranging from 100 to 300,000.

9. The aqueous composition for surface coating of claim 1, wherein the aqueous solvent is water or an alcohol.

10. The aqueous composition for surface coating of claim 1, wherein the aqueous composition for surface coating comprises 20 to 60% by weight of the main ingredient, 10 to 50% by weight of the curing agent, and 10 to 30% by weight of the aqueous solvent, based on the total weight of the aqueous composition for surface coating.

11. The aqueous composition for surface coating of claim 1, wherein, in addition to the main ingredient and the curing agent, the composition comprises at least one selected from the group consisting of silicone beads, urethane beads, acrylic beads, fluorine-containing waxes, and combinations thereof.

12. The aqueous composition for surface coating of claim 1, wherein, in addition to the main ingredient and the curing agent, the composition further comprises at least one selected from surfactants, co-solvents, modifiers, leveling agents, thickeners, and combinations thereof.

13. An automotive sheet, comprising:
a surface coating layer formed from the aqueous composition for surface coating defined in claim 1;
a cover layer formed under the surface coating layer;
a foaming layer formed under the cover layer; and
a backing layer formed under the foaming layer.

14. The automotive sheet of claim 13, wherein the surface coating layer is formed by applying the aqueous composition for surface coating with a thickness of 1 µm to 20 µm, followed by drying and aging.

15. The automotive sheet of claim 14, wherein the aging is carried out by a primary aging at a temperature of equal to or higher than a minimum film forming temperature (MFFT), and then a secondary aging at a temperature of equal to or higher than a glass transition temperature (Tg).

16. The automotive sheet of claim 13, wherein a primer layer is further formed between the surface coating layer and the cover layer.

* * * * *